(12) United States Patent
Dietz

(10) Patent No.: US 8,706,432 B2
(45) Date of Patent: Apr. 22, 2014

(54) RESISTOR MATRIX OFFSET COMPENSATION

(75) Inventor: Paul Dietz, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 298 days.

(21) Appl. No.: 13/111,630

(22) Filed: May 19, 2011

(65) Prior Publication Data

US 2012/0296588 A1   Nov. 22, 2012

(51) Int. Cl.
  *G01R 25/00* (2006.01)
(52) U.S. Cl.
  USPC .............................. 702/65; 345/10
(58) Field of Classification Search
  USPC ............................................ 702/65
  See application file for complete search history.

(56) References Cited

U.S. PATENT DOCUMENTS

| | | | | |
|---|---|---|---|---|
| 4,488,144 A * | 12/1984 | Wollman | ................ | 341/118 |
| 5,012,181 A * | 4/1991 | Eccleston | ................ | 324/74 |
| 5,038,142 A * | 8/1991 | Flower et al. | ................ | 341/34 |
| 5,187,483 A * | 2/1993 | Yonemaru | ................ | 341/156 |
| 5,563,632 A * | 10/1996 | Roberts | ................ | 345/173 |
| 5,717,321 A | 2/1998 | Kerth et al. | | |
| 5,751,276 A * | 5/1998 | Shih | ................ | 345/178 |
| 5,841,427 A | 11/1998 | Teterwak | | |
| 6,157,360 A * | 12/2000 | Jeong et al. | ................ | 345/98 |
| 6,177,918 B1 * | 1/2001 | Colgan et al. | ................ | 345/87 |
| 6,274,869 B1 * | 8/2001 | Butler | ................ | 250/338.1 |
| 6,285,358 B1 * | 9/2001 | Roberts | ................ | 345/173 |
| 6,357,302 B1 * | 3/2002 | Knapp | ................ | 73/862.626 |
| 6,506,983 B1 * | 1/2003 | Wilson et al. | ................ | 178/18.01 |
| 6,611,257 B1 * | 8/2003 | Dotson et al. | ................ | 345/174 |
| 6,747,263 B1 * | 6/2004 | Popov | ................ | 250/214 VT |
| 6,853,306 B1 * | 2/2005 | Nitschke et al. | ................ | 340/667 |
| 7,158,122 B2 * | 1/2007 | Roberts | ................ | 345/173 |
| 7,312,732 B2 * | 12/2007 | Engl | ................ | 341/118 |
| 7,312,734 B2 * | 12/2007 | McNeill et al. | ................ | 341/120 |
| 7,392,985 B1 * | 7/2008 | Lam | ................ | 273/238 |
| 7,394,309 B1 | 7/2008 | Potanin et al. | | |
| 7,612,690 B2 * | 11/2009 | Wright et al. | ................ | 341/26 |

(Continued)

OTHER PUBLICATIONS

Wang, et al., "Design and Implementation of Readout Circuit on Glass Substrate for Touch Panel Applications", Retrieved at<<http://ieeexplore.ieee.org/stamp/stamp.jsp?tp=&arnumber=5487426>>, Journal of Display Technology, vol. 6, No. 8, Aug. 2010, pp. 290-297.

(Continued)

*Primary Examiner* — Sujoy Kundu
*Assistant Examiner* — Alvaro Fortich
(74) *Attorney, Agent, or Firm* — Jeremy Snodgrass; Glen Johnson; Micky Minhas

(57) ABSTRACT

A method of measuring resistance in each of a plurality of resistors in a resistor matrix is provided. Each resistor is located at a different intersection between a column conductor and a row conductor. The method includes determining an offset error row current of each row conductor, scanning each row conductor to identify if that row conductor is connected to a column conductor by one of the plurality of resistors, scanning each resistor connected to that row conductor to determine if that resistor is connecting a column conductor to that row conductor, and if that resistor is connecting a column conductor to that row conductor, outputting an offset compensated resistance of that resistor calculated from the row current measured for that resistor less the offset error row current for that row conductor.

20 Claims, 7 Drawing Sheets

(56) References Cited

U.S. PATENT DOCUMENTS

| | | | |
|---|---|---|---|
| 7,692,638 B2* | 4/2010 | Land et al. | 345/173 |
| 7,800,586 B2* | 9/2010 | Serban et al. | 345/168 |
| 8,217,809 B2* | 7/2012 | Westhues et al. | 341/22 |
| 2004/0090239 A1* | 5/2004 | Ikeoku et al. | 326/30 |
| 2005/0007268 A1* | 1/2005 | Toda | 341/154 |
| 2005/0040928 A1 | 2/2005 | Lee et al. | |
| 2009/0212856 A1 | 8/2009 | Chen et al. | |
| 2010/0066567 A1* | 3/2010 | Dietz et al. | 341/22 |
| 2010/0066572 A1* | 3/2010 | Dietz et al. | 341/34 |
| 2010/0097343 A1* | 4/2010 | Fang | 345/174 |
| 2010/0122897 A1* | 5/2010 | Larsson | 200/5 A |
| 2010/0134437 A1* | 6/2010 | Yang et al. | 345/174 |
| 2010/0177058 A1* | 7/2010 | Lin | 345/174 |
| 2010/0271641 A1* | 10/2010 | Gupta et al. | 358/1.8 |
| 2011/0128235 A1* | 6/2011 | Rogers et al. | 345/173 |
| 2011/0309956 A1* | 12/2011 | Westhues et al. | 341/22 |
| 2012/0293449 A1* | 11/2012 | Dietz | 345/174 |

OTHER PUBLICATIONS

Alandry, et al., "An Optimized Electronic Architecture for Resistive Sensors", Retrieved at <<http://ieeexplore.ieee.org/stamp/stamp.jsp?tp=&arnumber=5486491, DTIP May 5-7, 2010, pp. 4.

* cited by examiner

RESISTOR MATRIX OFFSET COMPENSATION

BACKGROUND

Various types of electronic systems utilize input devices to receive input from a user. Some input devices may employ a plurality of variable resistors organized in a matrix. In a resistor matrix, each resistor selectively connects a row to a column. Pressure sensitive keyboards and resistor multi-touch devices are two examples of applications that incorporate a resistor matrix. In such applications, a row is electrically connected to a column responsive to force applied via touch input to the input device. A measurement circuit is used to identify such touch input. However, various non-idealities in device components can cause measurement errors.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A resistor matrix includes a plurality of resistors. Each resistor of the resistor matrix is located at a different intersection between a column conductor and a row conductor. An offset error current is determined for each row conductor. An offset compensated resistance of each resistor connecting a column conductor to a row conductor is output. The offset compensated resistance is calculated from the row current measured for that resistor less the offset error row current for that row conductor.

DETAILED DESCRIPTION

Figure 1:
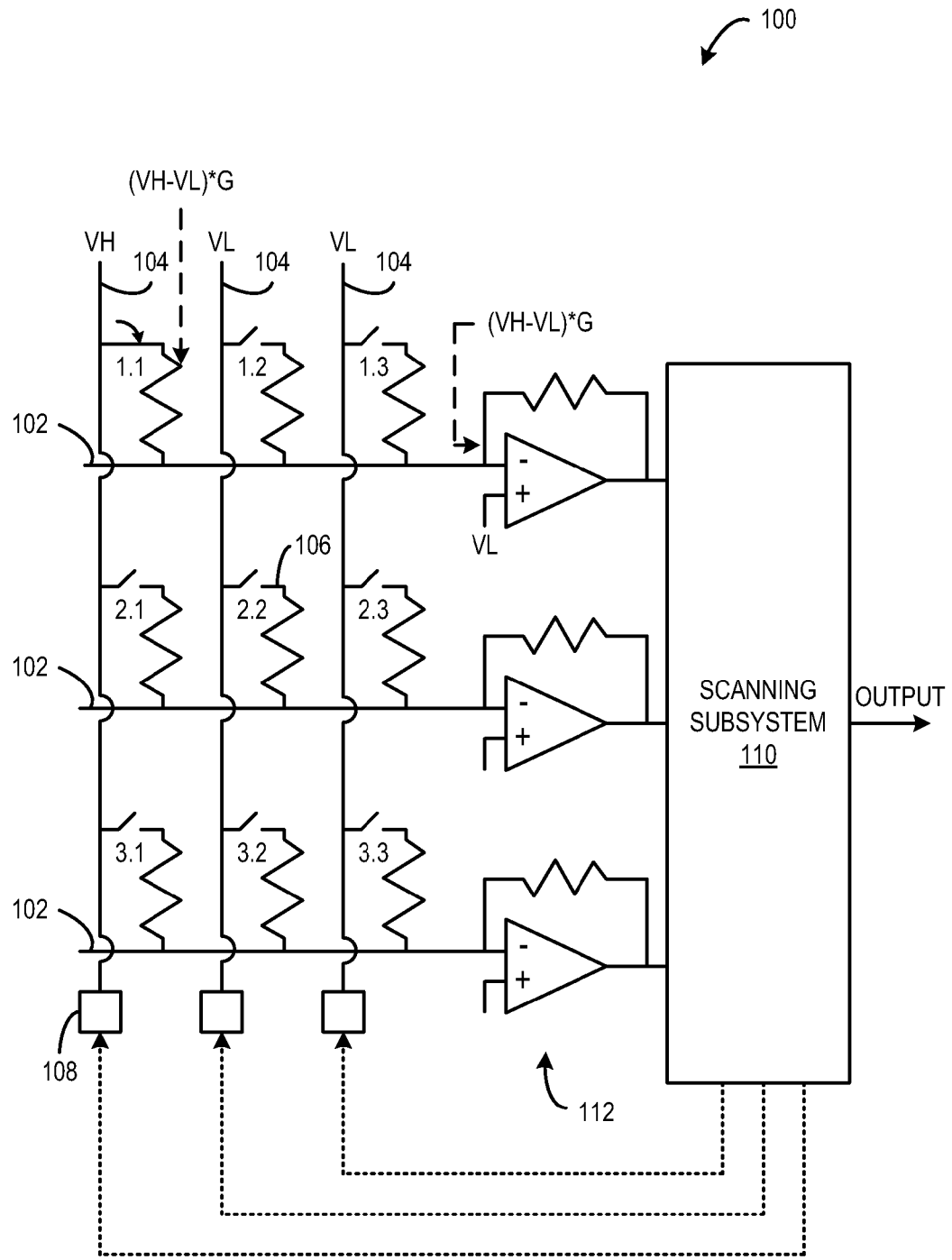
FIG. 1 schematically shows an example of an ideal resistance measurement of a resistor in a resistor matrix.

The present description relates to resistor matrices, and associated computing systems. A resistor matrix may be employed to detect touch input for an input or computing device. For example, in some implementations, key and touch approaches employ resistive actuation, in which force applied to a particular location on a device (e.g., through mechanical key actuation or a touch input) creates a change in resistance which produces a signal, for example by changing the current through a conductor that is detected by an associated measurement circuit.

FIGS. 1-4 schematically show an embodiment of a circuit including a resistor matrix 100. The resistor matrix 100 includes a plurality of column conductors 102 and a plurality of row conductors 104. The resistor matrix 100 includes a plurality of resistors 106 (e.g., 1.1, 1.2, 1.3, etc.). Each of the plurality of resistors 106 is located at a different intersection between a column conductor and a row conductor. Each of resistors 106 selectively connects a column conductor to a row conductor with a variable resistance. For example, resistor 1.1 can connect a first row conductor to a first column conductor, resistor 1.2 can connect a first row conductor and a second column conductor, and so on. In one example, the default state is for the resistors to be unconnected unless activated by input (e.g., a touch). Thus, the typical case is for none, or a relatively small fraction of the resistors to be connected at any one time.

With reference to discussion of the resistor matrix 100, it will be appreciated that a resistor that connects a column conductor to a row conductor may be referred to herein as a connecting resistor. Likewise, a resistor that does not connect a column conductor to a row conductor may be referred to herein as a non-connecting resistor. It will be appreciated that resistors that can connect to a row conductor may be referred to herein as being included in that row. Likewise, resistors that can connect to a column conductor may be referred to herein as being included in that column.

FIG. 1 shows an example of an ideal resistance measurement of resistor 1.1 in the resistor matrix 100. To measure the resistance of resistor 1.1, the column conductor that resistor 1.1 connects to a row conductor is set to a voltage VH, while all other column conductors that resistor 1.1 does not connect to a row conductor are set to a voltage VL that is different from voltage VH. In addition, the row conductor that resistor 1.1 connects to a column conductor is set to the voltage VL. The resistor 1.1 now has the voltage VH−VL across it, causing current to flow from the connecting column conductor, through resistor 1.1, to the connecting row conductor. Although there are potentially other resistors connected to this row conductor, the other resistors all have VL−VL=0 volts across them, so no current flows across them to contribute to the row current. Thus, all of the current through the resistor 1.1 flows through the connecting row conductor into a voltage source 112 that is connected to the row conductor, which drives the voltage source to voltage VL. By measuring this current, one can determine the resistance of the resistor 1.1 independent of any other resistor connected to the associated row conductor.

The above described resistance measurement in the resistor matrix 100 is ideal. In practice, various non-idealities in circuitry of the resistor matrix 100 may produce offset errors that result in less accurate measurements. For example, non-zero impedance in wires of the resistor matrix as well as in voltage sources that drive the resistor matrix may generate a measurement offset error. In particular, a measurement circuit (e.g., a transimpedance amplifier) may be a source of offset error. One source of error is due to voltage offset on the current measurement. For example, if a row voltage is not identical to a column voltage and there is a resistor connecting the row conductor to the column conductor, current will flow across the resistor and produce an error. The present description relates to systems and methods for determining offset error produced by a measurement circuit and/or other non-ideal components of a resistor matrix and compensating for the offset error in order to increase measurement accuracy.

Furthermore, the configuration of the measurement circuitry, as well as the scanning approach, may dictate the accuracy and time duration of a given scan of the resistor matrix. It is often desirable to perform scans in such a way so as to optimize both accuracy and the scan rate. The present description relates to quick scanning techniques of a resistor matrix that incorporate offset compensation. For example, the current contribution due to each resistor on a given row can be measured. As another example, a single measurement can determine the sum of the current contributions from any set of resistors on a given row. If the sum of an entire row is examined and found to be substantially zero, then it can be presumed that none of the resistors are connected, and no further scanning is required on that row. In a touch application, this may be a typical case.

In some implementations, a quick scanning technique further applies knowledge from one scan to the next scan. For example, on a given row, only resistors which were not connecting during a previous scan may be examined for connection, rather than scanning each resistor or entire rows. Such a technique takes advantage of the fact that from one scan to the next, the number of resistors that change state is typically very small, even when many keys are simultaneously depressed. If no new resistors are determined to be newly connecting, then only connecting resistors from the previous scan need to be examined. Given a rapid scan rate, no resistors changing state is the most typical case. Accordingly, this technique will typically outperform other resistor matrix scanning approaches that examine each resistor in a resistor matrix.

By employing offset error compensation with quick scanning techniques for a resistor matrix in an input device of a computing system, the computing system can be made more responsive and accurate. Moreover, the input device itself may spend more time in a low-power mode due to completing resistor matrix scans more quickly.

Continuing with FIGS. 1-4, in some implementations, each resistor within the resistor matrix 100 may serve as a touch sensor that indicates detection of a touch input responsive to force being applied to that resistor. Thus, the resistor is "pressure-sensitive" in that it responds to applied force over a given area of the touch sensor by changing a resistance proportional to an amount of force applied to that resistor. For example, when no touch inputs are being physically applied to the pressure-sensitive resistors, the resistors have a high resistance. The resistance of the row and column conductors (e.g., wires) may be presumed to be small (e.g., approximately zero) compared to the resistance of the resistors being measured.

As an example implementation, the plurality of column conductors 104 may be embedded in a first layer of the resistor matrix 100. The plurality of row conductors 102 may be embedded in a second layer that opposes the first layer. The second layer may be flexible, and may locally and temporarily deform when force is applied to connect a column conductor to a row conductor. The first and second layers may be any suitable material, such as a polyester film made from stretched polyethylene terephthalate (PET). The column conductors 104 and row conductors 102 may be any suitable conductive material. As a nonlimiting example, column conductors 104 and row conductors 102 may be silver ink deposited on the first layer and the second layer, respectively.

It will be appreciated that the illustrated embodiment is just one of many suitable configurations of sensing circuitry and should not be considered limiting. For example, a resistor matrix need not be fully connected (e.g., there need not be a resistor for every row/column pair), and that there are many topologically equivalent forms.

The resistor matrix 100 may further include output pins 108 configured to apply a voltage to a corresponding column conductor. In some cases, one or more column conductors may be driven to a desired voltage and/or one or more column conductors may be held at a virtual ground. The output pins 108 may be coupled to a scanning subsystem 110. The scanning subsystem 110 may apply different voltages to different output pins 108 to drive corresponding columns to different (or the same) desired voltages including virtual ground. The scanning subsystem 110 may be configured to vary the voltages applied to the output pins 108 rapidly as part of a fast scanning technique to measure resistances of resistors connected to selected row conductors 104 and/or column conductors 102 of the resistor matrix 100.

The resistor matrix 100 further includes a plurality of transimpedance amplifiers 112, each coupled to a corresponding row conductor 104 of the resistor matrix 100. Each of the transimpedance amplifiers 112 may act as a measurement circuit to measure a row current of a row conductor coupled to that transimpedance amplifier. Note the transimpedance amplifiers 112 may be collectively referred to as a measurement circuit for the resistor matrix 100. Each of the transimpedance amplifiers 112 may be configured to hold a corresponding row conductor at virtual ground or another desired voltage to measure a row conductor. As an example, when a resistive switch is closed, such as due to the application of touch input, the row conductor and the column conductor are connected via the closed switch to complete the circuit. If the column conductor connected to the closed resistive switch is being held at a voltage that differs from the corresponding row conductor, current flows across the resistive switch to the transimpedance amplifier associated with that row conductor. Since the transimpedance amplifier is holding the row conductor at virtual ground, receipt of such current results in the transimpedance amplifier measuring the resulting row current to ground by outputting a proportional voltage to the scanning subsystem 110. Accordingly, by setting a single column conductor to a desired voltage while holding other column conductors in the row at virtual ground, a single resistor can set the current of each row conductor and correspondingly the resistance of that resistor can be determined by the scanning subsystem 110.

Figure 2:
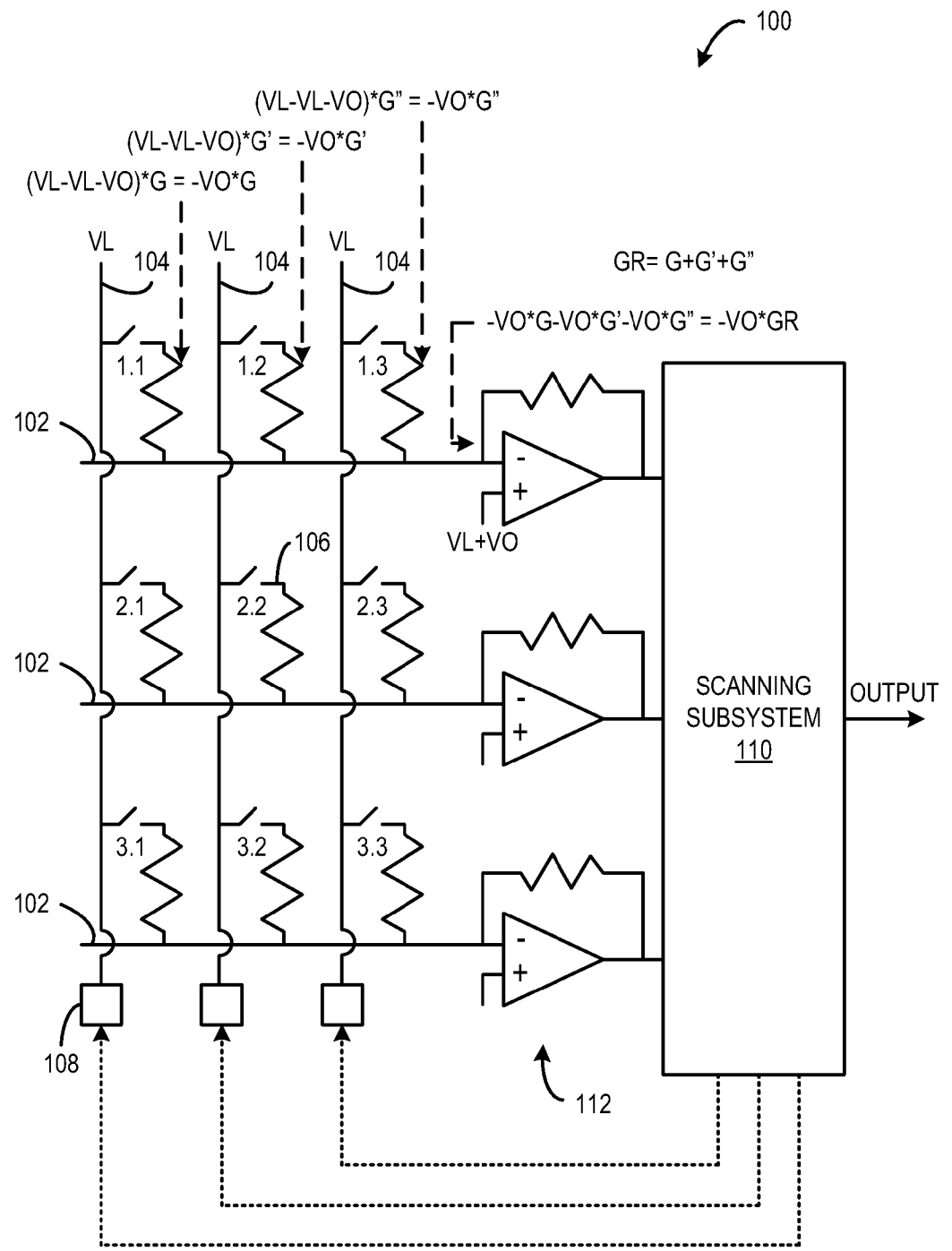
FIG. 2 schematically shows an example of determining an offset error row current of a row conductor of the resistor matrix of FIG. 1.
Figure 3:
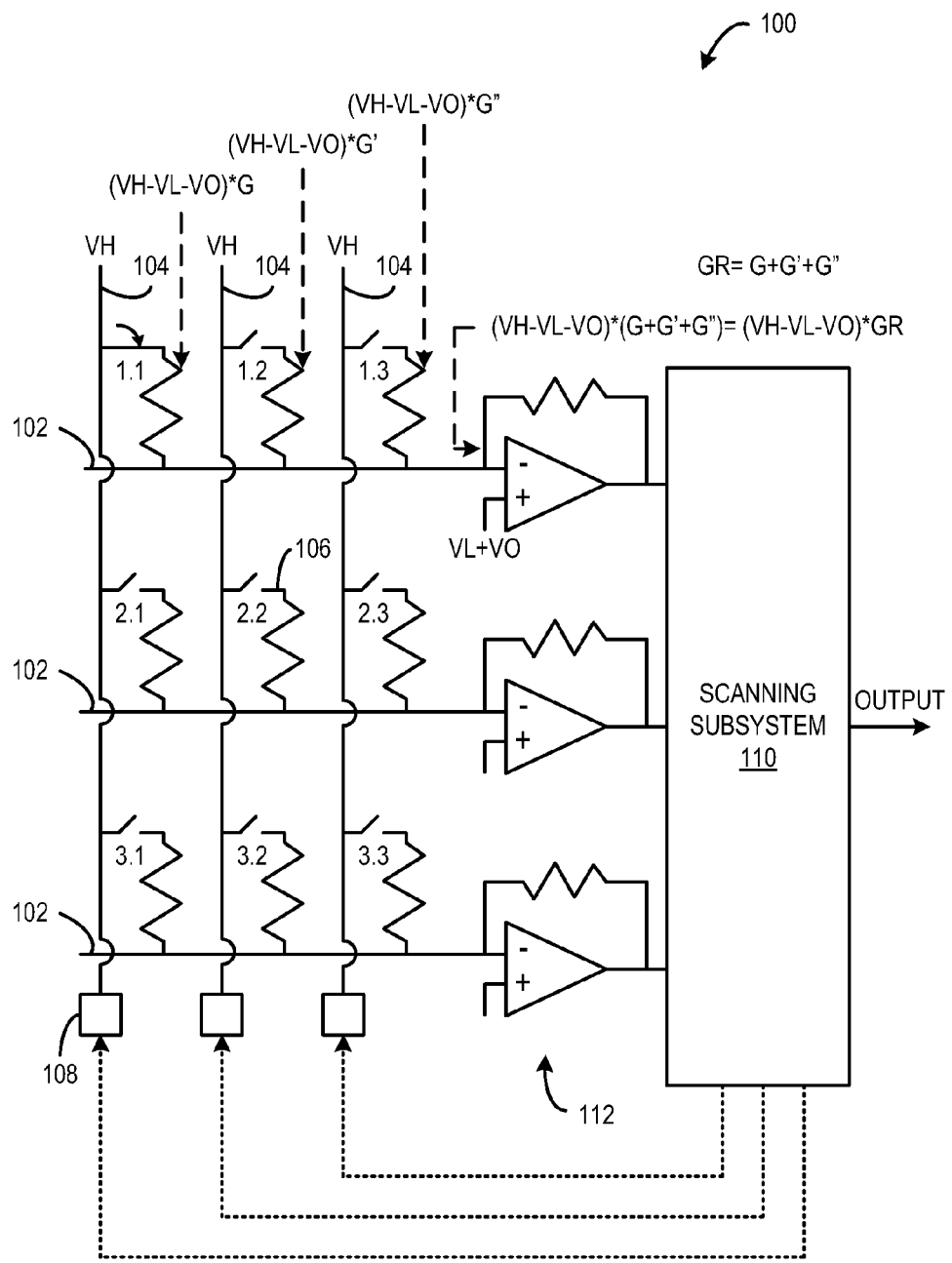
FIG. 3 schematically shows an example of a scan to identify if a row conductor is connected to a column conductor by one of a plurality of resistors of the resistor matrix of FIG. 1.
Figure 4:
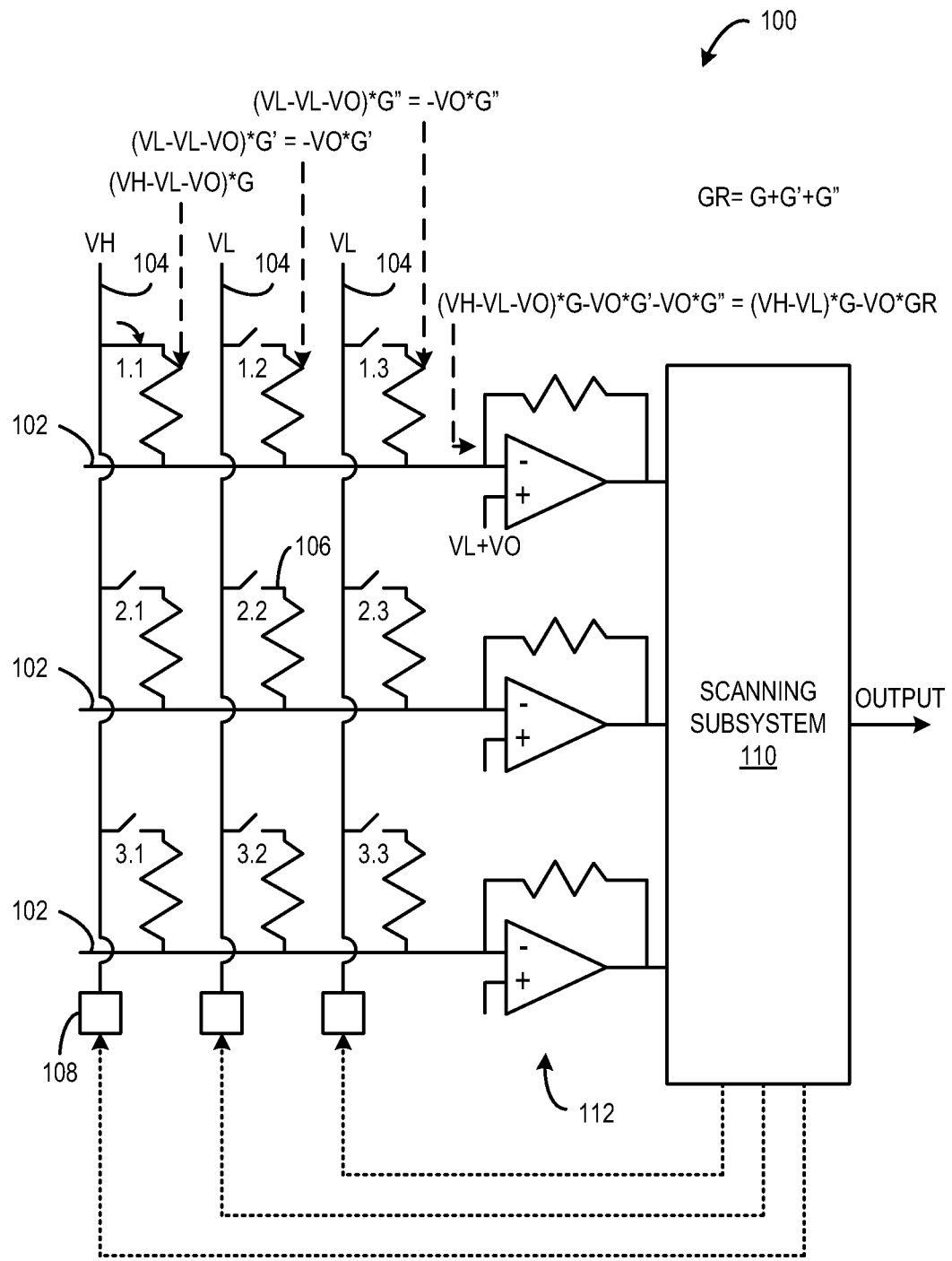
FIG. 4 schematically shows an example of a scan to determine if a resistor is connecting a column conductor to a row conductor of the resister matrix of FIG. 1.
Figure 5A:
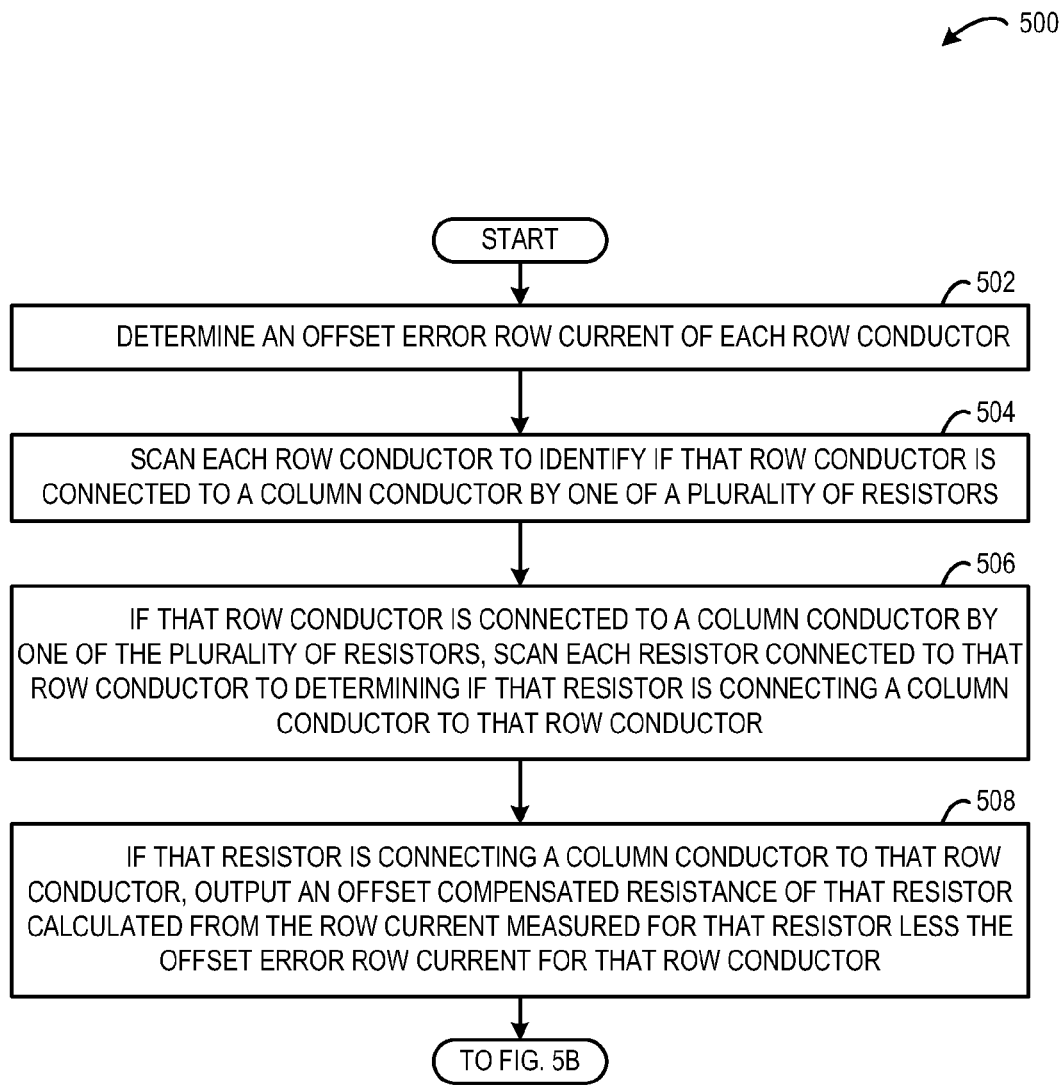
FIGS. 5A-5B show a flow diagram of an embodiment of a method for measuring resistance in each of a plurality of resistors arranged in a resistor matrix.
Figure 5B:
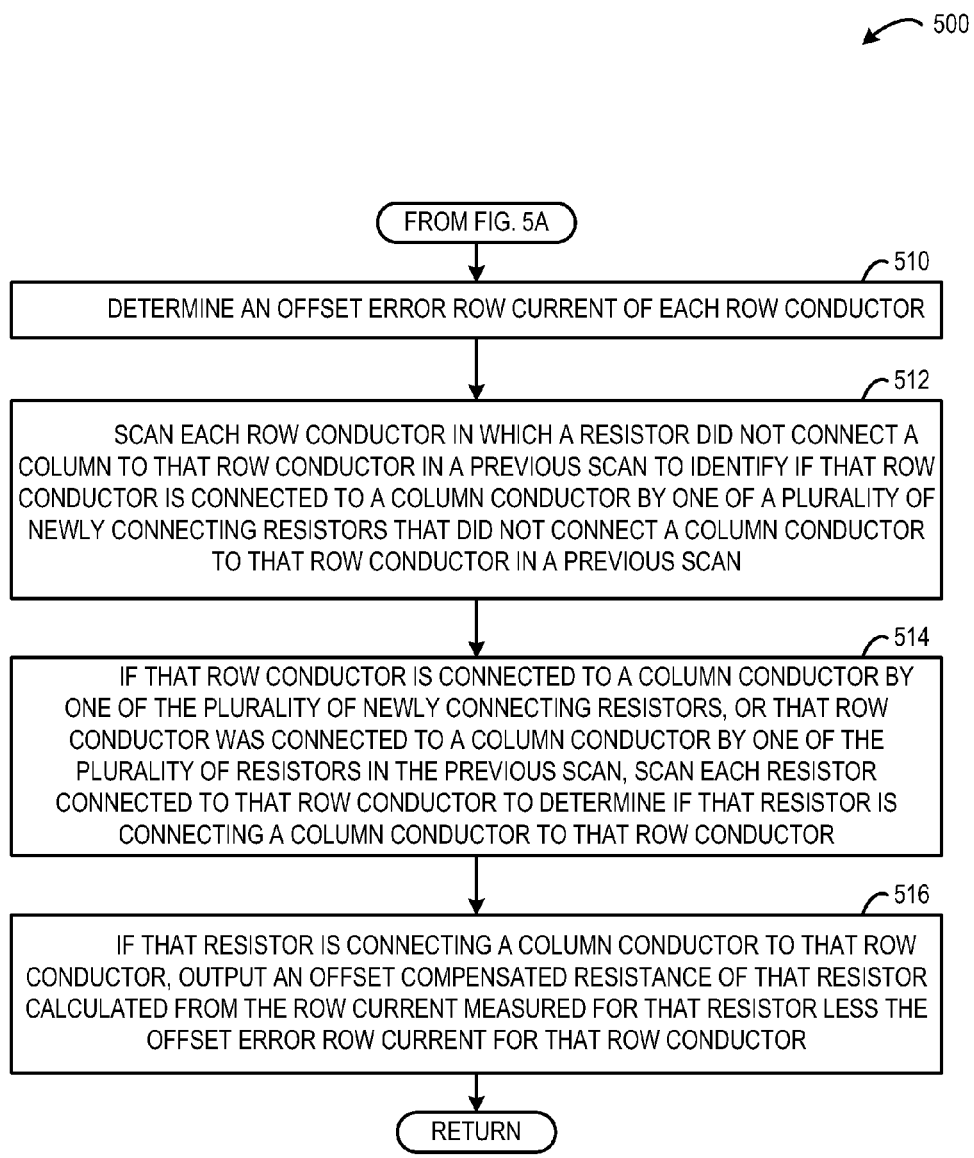

As introduced above, various components of the resistor matrix 100 may have non-idealities that produce offset measurement errors. One example of such an offset may be produced by the transimpedance amplifiers 112. Turning to FIGS. 5A-5B, such offset measurement errors may be compensated for in a method 500 for scanning a resistor matrix. The method 500 may be carried out to scan a resistor matrix for closed resistive switches, which for example indicate touch input, by measuring row currents of selected row conductors to determine the resistance of selected resistors. The method 500 is herein discussed in detail with reference to FIGS. 2-4. FIG. 2 shows an example of determining an offset error row current of a row conductor. FIG. 3 shows an example of a scan to identify if a row conductor is connected to a column conductor by one of a plurality of resistors. FIG. 4 schematically shows an example of a scan to determine if a resistor is connecting a column conductor to a row conductor.

At 502, method 500 includes determining an offset error row current for each row conductor. As an example, the offset error row current may be determined by applying a same voltage to a row conductor and all column conductors that can be connected to that row conductor, and measuring an offset error row current of that row conductor. Since the same voltage is applied to the columns and the row, approximately no current flows through the resistors to contribute to the row current. As such, the offset produced by the measurement circuit is the contributing source of the row current, which exposes the offset error produced by the measurement circuit. Note, in some implementations, the offset error row current may only be determined for row conductors in which a column conductor is connected to that row conductor by a resistor coupled to that row conductor.

As a particular example, referring to FIG. 2, to determine the offset error row current of the first row conductor, the scanning subsystem 110 drives the output pins 108 of each column conductor to voltage VL and the transimpedance amplifier 112 servos the first row conductor to the same voltage VL. The transimpedance amplifier 112 produces an offset voltage VO. This sets the row voltage of the first row conductor to VL+VO, thus putting VL−VL−VO=−VO across each of the resistors in the row. Thus, the row current measurement equals the offset error, which equals a product of the offset voltage (−VO) produced by the transimpedance amplifier and a sum of the conductance (GR=G+G'+G") of all of the resistors connected to the row. Once the offset error row current is measured directly, it can be subtracted off of each measurement on that row to produce an offset compensated output. Note an offset error may be row-specific. In some implementations, offset errors may only affect rows that include connecting resistors. As such, in some implementations, rows that include no connecting resistors need not be scanned to determine an offset error row current. Accordingly, a number of measurements performed during a scan of the resistor matrix may be reduced for faster scanning of the resistor matrix.

At 504, method 500 includes scanning each row conductor to identify if that row conductor is connected to a column conductor by one of a plurality of resistors. As an example, a row conductor may be examined by applying a test voltage to all column conductors that can be connected to that row conductor, applying a different test voltage to that row conductor, measuring a row current of that row conductor, and identifying that row conductor as being connected to a column conductor by one of the plurality of resistors if the row current of that row conductor is greater than a current threshold. As a particular example, referring to FIG. 3, the scanning subsystem 110 drives the output pins 108 of each column to voltage VH and a transimpedance amplifier 112 coupled to the first row conductor servos the first row to voltage VL. As an example, voltage VL is set to virtual ground. Further, the transimpedance amplifier 112 produces an offset voltage VO, which is represented in the figures as an additional voltage applied to the negative terminal of an ideal op amp. Thus, the row current measurement for the first row conductor equals a product of a sum of the voltage (VH−VL−VO) from all of the resistors connected to the first row conductor and a sum of the conductance (GR=G+G'+G") of all of the resistors connected to the first row conductor (e.g., resistors 1.1, 1.2, and 1.3).

The row current measurement may be compared to a current threshold to determine if the row conductor is connected to a column conductor by any of the resistors coupled to the row conductor. The row conductor may be identified as being connected to a column conductor by one of the plurality of resistors coupled to the row conductor if the row current of that row conductor is greater than a current threshold. For example, the current threshold may be a current equal to a row current when no resistors connect a column conductor to that row conductor. Assuming that the resistance of a resistor drops when it becomes a connecting resistor and closes a circuit that allows current to flow from the column conductor to the row conductor, any current measurement greater than the current threshold may indicate one or more resistors coupled to the row conductor are currently connecting a column conductor to the row conductor.

Referring to FIG. 3, resistor 1.1 is shown connecting the first column conductor to the first row conductor. The current from the first column conductor flows across resistor 1.1 to the first row conductor to increase the row current of the first row conductor. On the other hand, resistors 1.2 and 1.3 are not connecting column conductors to the first row conductor and thus no current flows across these resistors to contribute to the row current of the first row conductor. However, the current flowing across resistor 1.1 increases the row current of the first row conductor so that it is greater than the current threshold. Accordingly, the first row conductor is identified as including a resistor that connects a column conductor to the first row conductor. Each row in the resistor matrix may be scanned in the above described manner to determine which rows include connecting resistors.

At 506, method 500 includes if a row conductor is connected to a column conductor by one or more of the plurality of resistors, scanning each resistor connected to that row conductor to determine if that resistor is connecting a column conductor to that row conductor. As an example, it can be determined if that resistor is connecting a column conductor to that row conductor by applying a test voltage to a column conductor connected to that resistor, applying a different voltage to the row conductor and all other columns conductors that can be connected to that row conductor, measuring a row current of that row conductor, and identifying that row conductor as being connected to a column conductor by that resistor if the row current is greater than a threshold current.

As a particular example, referring to FIG. 4, to determine if the resistor 1.1 is connecting the first column conductor to the first row conductor, the scanning subsystem 110 drives the output pin of the first column conductor to voltage VH and the other column conductors that can be connected to the first row conductor to voltage VL, and the transimpedance amplifier 112 servos the row conductor to voltage VL. The transimpedance amplifier 112 produces an offset voltage VO. This sets the row voltage to VL+VO, thus putting voltage VH−VL−VO across the first resistor and voltage VL−VL−VO=−VO across each of the other resistors coupled tot the first row conductor. Thus, the row current measurement includes offset error terms from each of the resistors coupled to the first row conductor. In particular, the current through the resistor 1.1 is (VH−VL−VO)*G rather than (VH−VL)*G, where G is the conductance (1/R) of the resistor 1.1. Additionally, the current from the other resistors coupled to the row conductor is non-zero, so the measurement of the row current now includes terms from each of the other resistors in the row. Since these column conductors are set at voltage VL, the voltage across each of resistors 1.2 and 1.3 is VL−VL−VO=−VO, producing an error current of −VO*GO, where GO is the sum of the conductance of each of the other resistors in the row, namely resistors 1.2 and 1.3. Including all of the error terms, the measured row current is (VH−VL−VO)*G−VO*GO, rather than (VH−VL)*G, giving an offset measurement error of −VO*G−VO*GO=−VO*GR, where GR is the sum of all resistor conductance on the row, including the resistor of interest.

In some implementations, determining the offset error for each row conductor at 502 includes measuring the offset error row current prior to scanning each resistor connected to that row conductor. This may be done to determine if that resistor is connecting a column conductor to that row conductor. Furthermore, the offset error row current may be measured upon completion of scanning each resistor connected to that row conductor. The offset error row current may be linearly interpolated in accordance with both offset error row current measurements. By linearly interpolating offset error current measurements sampled before and after resistor specific measurements of a row, the linearly interpolated offset error may account for changes in resistor values due to varying conditions (e.g., varying touch input force) during the resistor-specific measurements of resistors in the row. It will be appreciated that any suitable interpolation technique may be employed to account for varying resistor values without departing from the scope of this description.

At 508, method 500 includes if a resistor is connecting a column conductor to that row conductor, outputting an offset compensated resistance of that resistor. The offset compensated resistance may be calculated from the row current measured for that resistor less the offset error row current for that row conductor. As discussed above, the offset error row current may be measured directly. The offset error row current can be subtracted directly from the current measurement of the resistor to compensate for the offset error. As a particular example, referring to FIG. 3, the scanning subsystem 110 may subtract the offset error row current VO*GR measured for the first row conductor from the row current (VH−VL−VO)*G−VO*GO measured for the resistor 1.1 to output an offset compensated resistance of the resistor 1.1.

In some implementations, knowledge of a previous scan may be utilized to speed up a scan rate by reducing a number of measurements. For example, from one scan to the next, there may be a high likelihood that a number of resistors that change state between connecting and non-connecting is small.

At 510 of FIG. 5B, method 500 includes subsequent to outputting an offset compensated resistance of resistors that connect a column conductor to a row conductor in a previous scan, determining an offset error row current of each row conductor. The offset row current may be determined for each row as discussed above at 502.

To leverage the typically small number of resistor state changes between resistor matrix scans, at 510 of FIG. 5B, method 500 includes subsequent to outputting an offset compensated resistance of resistors that connect a column conductor to a row conductor in the previous scan, scanning each row conductor in which a resistor did not connect a column conductor to that row conductor in the previous scan. This may be done to identify if that row conductor is connected to a column conductor by one of a plurality of newly connecting resistors that did not connect a column conductor to that row conductor in a previous scan.

As one example, scanning each row conductor in which a resistor did not connect a column conductor to that row conductor in the previous scan includes applying a test voltage (e.g., VH) to column conductors that were not connected to that row conductor, applying a different test voltage (e.g., VL) to the row conductor and column conductors that were connected to that row conductor, and measuring a row current of that row conductor. In this way, a row conductor may be identified as being connected to a column conductor by one of the plurality of resistors if the row current of that row conductor is greater than a current threshold. Rather than testing entire rows of resistors, only resistors determined to be non-connecting resistors in the previous scan are tested. This partial row testing can be accomplished, for example, by only setting all of the columns in which no resistor was connecting in the previous scan to a desired voltage while holding the other columns in the row at virtual ground. This has the effect of testing if any previously determined non-connecting resistors have changed state and are now newly connecting resistors. If no resistors change state from non-connecting to connecting, then only the connecting resistors from the previous scan need to be examined. Given that no resistors changing state is the most common case, by only checking non-connecting resistors in ensuing scans, the number of current measurements may be reduced. Accordingly, the speed of scanning the resistor matrix may be increased.

At 514, method 500 includes if that row conductor is connected to a column conductor by one of the plurality of newly connecting resistors, or that row conductor was connected to a column conductor by one of the plurality of resistors in the previous scan, scanning each resistor connected to that row conductor to determine if that resistor is connecting a column conductor to that row conductor.

At 516, method 500 includes if that resistor is connecting a column conductor to that row conductor, outputting an offset compensated resistance of that resistor calculated from the row current measured for that resistor less the offset error row current for that row conductor.

It will be appreciated that the above described method can be continually repeated at a desired frequency to continuously monitor each resistor for changes in resistance.

The above described method increases resistive value measurement accuracy by compensating for offset error generated by measurement circuits of a resistor matrix. In particular, the method measures an offset error current directly by manipulating voltage inputs to the resistor matrix, and subtracts the offset error directly from each resistor measurement to output an offset compensated resistance. Moreover, the above described method can increase a scanning rate of the resistor matrix by reducing a number of superfluous measurements during matrix scans.

In some implementations, the method may be applied to pressure-sensitive resistors in a resistor matrix. For example, the method may include determining an offset error row current for a row conductor of the resistor matrix. Furthermore, the method may include if a pressure-sensitive resistor is connecting a column conductor to the row conductor, outputting an offset compensated resistance of that pressure-sensitive resistor calculated from the row current measured for that pressure-sensitive resistor less the offset error row current for the row conductor. The method recognizes that the error term can be measured directly and subtracted from the output to provide an error compensated result.

Figure 6:
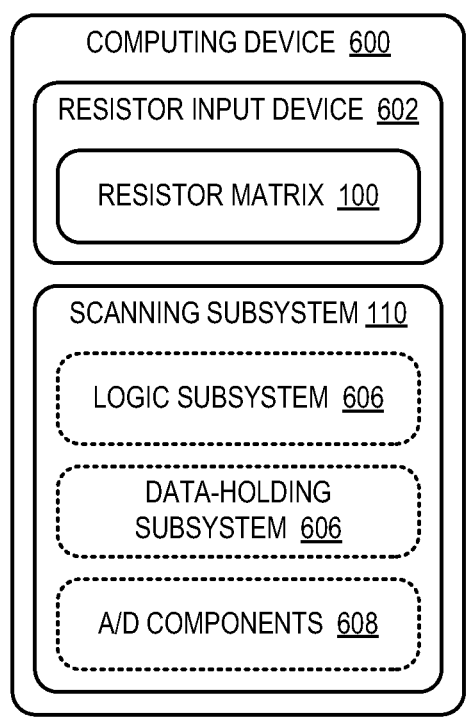
FIG. 6 shows a block diagram of an embodiment of a computing system that may be employed in connection with the resistor matrix of FIG. 1.

FIG. 6 schematically shows a nonlimiting computing device 600 that may perform one or more of the above described methods and processes. Computing device 600 is shown in simplified form. It is to be understood that virtually any computer architecture may be used without departing from the scope of this disclosure. In different embodiments, computing device 600 may take the form of a laptop computer, tablet computer, home entertainment computer, network computing device, mobile computing device, mobile communication device, gaming device, user-input peripheral, etc.

Computing device 600 includes a scanning subsystem 110. In some implementations, the scanning subsystem may include a logic subsystem 604, a data-holding subsystem 606, and analog and/or digital components 608. Computing device 600 may optionally include a display subsystem, communication subsystem, and/or other components not shown in FIG. 6. Computing device 600 may also optionally include user input devices such as keyboards, mice, game controllers, cameras, microphones, and/or touch screens, for example. In some implementations, such input devices may include resistor input device 602. The resistor input device 602 may include any suitable input device that may utilize the resistor matrix 100 to detect input. For example, the resistor input device 602 may include a keyboard, a touch input surface, a multi-touch sensor, etc.

Logic subsystem 604 may include one or more physical devices configured to execute one or more instructions. For example, the scanning subsystem may be configured to execute one or more instructions that are part of one or more applications, services, programs, routines, libraries, objects, components, data structures, or other logical constructs, such as instructions to control matrix inputs to resistor matrix 100 of resistive input device 602 and the described scanning operations for resistive values of the resistor matrix 100. Such instructions may be implemented to perform a task, implement a data type, transform the state of one or more devices, or otherwise arrive at a desired result.

The logic subsystem 604 may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Data-holding subsystem 606 may include removable media and/or built-in devices. Data-holding subsystem 606 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Data-holding subsystem 604 may include devices with one or more of the following characteristics: volatile, nonvolatile, dynamic, static, read/write, read-only, random access, sequential access, location addressable, file addressable, and content addressable. In some embodiments, logic subsystem 604 and data-holding subsystem 606 may be integrated into one or more common devices, such as an application specific integrated circuit or a system on a chip.

Data-holding subsystem 606 may include removable computer-readable storage media, which may be used to store and/or transfer data and/or instructions executable to implement the herein described methods and processes. Removable computer-readable storage media may take the form of CDs, DVDs, HD-DVDs, Blu-Ray Discs, EEPROMs, and/or floppy disks, among others.

It is to be appreciated that data-holding subsystem 606 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

When included, analog and/or digital components 608 may include integrated circuits that receive output from the measurement circuit 112 and manipulate the received voltage to determine a resistance of a resistor of interest. For example, the analog and/or digital components 608 may include offset voltage determination circuits, subtraction circuits, and the like to provide an error compensated output to an analog-to-digital (A/D) converter. It will be appreciated that any suitable analog and/or digital circuits may be employed. In some implementations, the analog and/or digital circuits 608 may be integrated onto a single chip. In some implementations, each Op amp of measuring circuit 112 may provide output to a multiplexor. The multiplexor further may provide output to an analog-to-digital converter. The analog-to-digital converter may receive voltage measurements, selected via the multiplexor, that are proportional to row current measured by the Op amps. By coupling the Op amps to the multiplexor, offset compensation circuitry, and correspondingly, costs may be reduced.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of measuring resistance in each of a plurality of resistors arranged in a resistor matrix, each resistor being located at a different intersection between a column conductor and a row conductor, and each resistor selectively connecting that column conductor to that row conductor with a variable resistance, the method comprising:
    applying a column conductor voltage and a row conductor voltage to determine an offset error row current of each row conductor;
    scanning each row conductor to identify if that row conductor is connected to a column conductor by one of the plurality of resistors;
    if that row conductor is connected to a column conductor by one of the plurality of resistors, scanning each resistor connected to that row conductor to determine if that resistor is connecting a column conductor to that row conductor; and
    if that resistor is connecting a column conductor to that row conductor, outputting an offset compensated resistance of that resistor calculated from a row current measured for that resistor less the offset error row current for that row conductor.

2. The method of claim 1, wherein scanning each row conductor includes applying a test voltage to all column conductors that can be connected to that row conductor, applying a different test voltage to that row conductor, measuring a row current of that row conductor, and identifying that row conductor as being connected to a column conductor by one of the plurality of resistors if the row current of that row conductor is greater than a current threshold.

3. The method of claim 1, wherein determining an offset error row current for each row conductor includes for a given row conductor, applying a same voltage to all column conductors that can be connected to that row conductor and that row conductor, and measuring an offset error row current of that row conductor.

4. The method of claim 3, wherein determining the offset error row current for each row conductor includes for a given row conductor, measuring the offset error row current prior to scanning each resistor connected to that row conductor to determine if that resistor is connecting a column conductor to that row conductor and measuring the offset error row current upon completion of scanning each resistor connected to that row conductor, and linearly interpolating the offset error row current in accordance with both offset error row current measurements.

5. The method of claim 1, wherein scanning each resistor connected to that row conductor to determine if that resistor is connecting a column conductor to that row conductor includes applying a test voltage to a column conductor connected to that resistor, applying a different voltage to the row conductor and all other column conductors that can be connected to that row conductor, measuring a row current of that row conductor, and identifying that row conductor as being connected to a column conductor by that resistor if the row current is greater than a threshold current.

6. The method of claim 1, further comprising:
subsequent to outputting the offset compensated resistance of resistors that connect a column conductor to a row conductor, determining an offset error row current of each row conductor;
subsequent to outputting the offset compensated resistance of resistors that connect a column conductor to a row conductor, scanning each row conductor in which a resistor did not connect a column conductor to that row conductor in a previous scan to identify if that row conductor is connected to a column conductor by one of a plurality of newly connecting resistors that did not connect a column conductor to that row conductor in a previous scan;
if that row conductor is connected to a column conductor by one of the plurality of newly connecting resistors, or that row conductor was connected to a column conductor by one of the plurality of resistors in the previous scan, scanning each resistor connected to that row conductor to determine if that resistor is connecting a column conductor to that row conductor; and
if that resistor is connecting a column conductor to that row conductor, outputting an offset compensated resistance of that resistor calculated from the row current measured for that resistor less the offset error row current for that row conductor.

7. The method of claim 6, wherein scanning each row conductor in which a resistor did not connect a column conductor to that row conductor in the previous scan includes applying a test voltage to column conductors that were not connected to that row conductor by one of the plurality of resistors in the previous scan, applying a different test voltage to the row conductor and column conductors that were connected to that row conductor by one of the plurality of resistors in the previous scan, measuring a row current of that row conductor, and identifying that row conductor as being connected to a column conductor by one of the plurality of resistors if the row current of that row conductor is greater than a current threshold.

8. The method of claim 1, wherein a measurement circuit includes a transimpedance amplifier for each row conductor.

9. A computing device, comprising:
a resistor matrix including a plurality of resistors each being located at a different intersection between a column conductor and a row conductor, and each resistor selectively connecting that column conductor to that row conductor with a variable resistance;
a measurement circuit to measure a row current of each row conductor of the resistor matrix;
a scanning subsystem holding instructions executable to:
apply a column conductor voltage and a row conductor voltage to determine an offset error row current for each row conductor;
scan each row conductor to identify if that row conductor is connected to a column conductor by one of the plurality of resistors;
if that row conductor is connected to a column conductor by one of the plurality of resistors, scan each resistor connected to that row conductor to determine if that resistor is connecting a column conductor to that row conductor; and
if that resistor is connecting a column conductor to that row conductor, output an offset compensated resistance of that resistor calculated from the row current measured for that resistor less the offset error row current for that row conductor.

10. The computing device of claim 9, wherein scanning each row conductor to identify if that row conductor is connected to a column conductor by one of the plurality of resistors includes applying a test voltage to all column conductors that can be connected to that row conductor, applying a different test voltage to that row conductor, measuring a row current of that row conductor, and identifying that row conductor as being connected to a column conductor by one of the plurality of resistors if the row current of that row conductor is greater than a current threshold.

11. The computing device of claim 9, wherein determining an offset error row current for each row conductor includes for a given row conductor, applying a same voltage to all column conductors that can be connected to that row conductor and that row conductor, and measuring an offset error row current of that row conductor.

12. The computing device of claim 11, wherein determining the offset error row current for each row conductor includes for a given row conductor, measuring the offset error row current prior to scanning each resistor connected to that row conductor to determine if that resistor is connecting a column conductor to that row conductor and measuring the offset error row current upon completion of scanning each resistor connected to that row conductor, and linearly interpolating the offset error row current in accordance with both offset error row current measurements.

13. The computing device of claim 9, wherein scanning each resistor connected to that row conductor to determine if that resistor is connecting a column conductor to that row conductor includes applying a test voltage to a column conductor connected to that resistor, applying a different voltage to the row conductor and to all other column conductors that can be connected to that row conductor, measuring a row current of that row conductor, and identifying that row conductor as being connected to a column conductor by that resistor if the row current is greater than a threshold current.

14. The computing device of claim 9, wherein the scanning subsystem further holds instructions executable to:
subsequent to outputting the offset compensated resistance of resistors that connect a column conductor to a row conductor, determine an offset error row current of that row conductor;
subsequent to outputting the offset compensated resistance of resistors that connect a column conductor to a row conductor, scan each row conductor in which a resistor did not connect a column conductor to that row conductor in a previous scan to identify if that row conductor is connected to a column conductor by one of a plurality of newly connecting resistors that did not connect a column conductor to that row conductor in a previous scan;

if that row conductor is connected to a column conductor by one of the plurality of newly connecting resistors, or that row conductor was connected to a column conductor by one of the plurality of resistors in the previous scan, scan each resistor connected to that row conductor to determine if that resistor is connecting a column conductor to that row conductor; and if that resistor is connecting a column conductor to that row conductor, output an offset compensated resistance of that resistor calculated from the row current measured for that resistor less the offset error row current for that row conductor.

15. The computing device of claim 14, wherein scanning each row conductor in which a resistor did not connect a column conductor to that row conductor in the previous scan includes applying a test voltage to column conductors that were not connected to that row conductor by one of the plurality of resistors in the previous scan, applying a different test voltage to the row conductor and to column conductors that were connected to that row conductor by one of the plurality of resistors in the previous scan, measuring a row current of that row conductor, and identifying that row conductor as being connected to a column conductor by one of the plurality of resistors if the row current of that row conductor is greater than a current threshold.

16. The computing device of claim 9, wherein the measurement circuit includes a transimpedance amplifier for each row conductor.

17. A computing device, comprising:
  a resistor matrix including a plurality of pressure-sensitive resistors each being located at a different intersection between a column conductor and a row conductor, and each pressure-sensitive resistor selectively connecting that column conductor to that row conductor with a variable resistance;
  a measurement circuit to measure a row current of each row conductor of the resistor matrix;
  a scanning subsystem holding instructions executable to:
    apply a column conductor voltage and a row conductor voltage to determine an offset error row current for a row conductor; and
    if a pressure-sensitive resistor is connecting a column conductor to the row conductor, output an offset compensated resistance of that pressure-sensitive resistor calculated from the row current measured for that pressure-sensitive resistor less the offset error row current for the row conductor.

18. The computing device of claim 17, wherein the resistor matrix includes a first layer comprising a plurality of column conductors; and a second layer, opposing the first layer, comprising a plurality of row conductors, the first layer and/or the second layer being flexible to locally and temporarily deform when force is applied to connect a column conductor to a row conductor.

19. The computing device of claim 17, wherein determining an offset error row current for that row conductor includes applying a same voltage to all column conductors that can be connected to that row conductor and that row conductor, and measuring an offset error row current of that row conductor.

20. The computing device of claim 17, wherein the measurement circuit includes a transimpedance amplifier.

* * * * *